(No Model.)

E. S. RICH.
FILTER CASE.

No. 293,519.  Patented Feb. 12, 1884.

Witnesses:
Homer Worden.
Frederick Luxton.

Inventor.
Edwin S. Rich.

UNITED STATES PATENT OFFICE.

EDWIN S. RICH, OF JERSEY CITY, NEW JERSEY.

FILTER-CASE.

SPECIFICATION forming part of Letters Patent No. 293,519, dated February 12, 1884.

Application filed September 26, 1883. (No model.)

*To all whom it may concern:*

Be it known that I, EDWIN S. RICH, a citizen of the United States, and a resident of Jersey City Heights, in the county of Hudson and State of New Jersey, have invented a new and useful Improvement in a Filter or Filter-Case, (the same has not been in public use or on sale in the United States for more than two years prior to the application in this country,) of which the following is a specification.

The object of my invention is to make a filter or filter-case so constructed that it can be taken apart with the least amount of trouble for the purpose of cleansing or putting in new filtering material by any inexperienced person.

Figure 1:
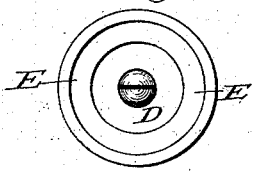
Figure 2:
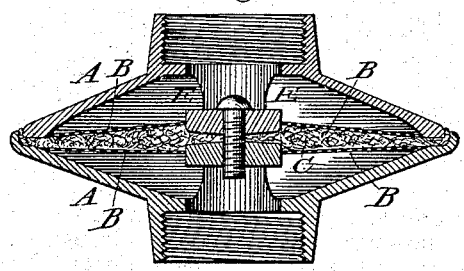
Figure 3:
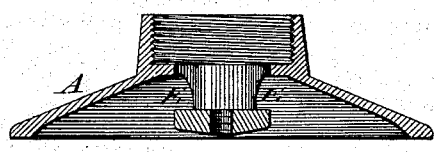

In the accompanying drawings, Figure 1 represents a top view of the threaded collar of my improved filter or filter-case. Fig. 2 is a vertical central section of the entire reversible filter, and Fig. 3 shows one of the shells.

Similar letters refer to similar parts throughout the several views.

The invention will first be described in connection with drawings, and then pointed out in the claims.

In the drawings, A A represent two cast, spun, or stamped shells, of suitable material, with threaded collars to screw on a faucet, which penetrate to the center and face each other on a line with the face of each shell, where they fit together, and through this penetrating collar are two water-ways, E E.

B B are two circular perforated plates, to prevent the sagging of the filtering material, C, when it is of a soft material; otherwise they can be dispensed with.

C represents the filtering material, which can be of felt, paper, or other filtering material.

D is the screw that holds the filter together.

It will be perceived that the upper and lower shells, A A, and the screw D form a vise in which to grip the filtering material C, which is placed between the two shells and screwed up tight with the screw D, thus making a tight packing both at the center of the penetrating collar and outer edges of the shells, and leaving the balance for filtering purposes.

I will now explain how to operate and use it: First, it is a reversible filter, and can be reversed on a faucet at any moment that the party using it may see fit to do so. Now, then, to clean it or put in new filtering material, take a screw-driver and screw out the screw D, and the filter will fall apart, and it being so plain and simple it can be thoroughly cleaned in a few minutes, and, if desired, new filtering material can be put in, take a piece of filtering material, put a hole through the center the size of the screw D; then put the screw through one shell, then through the filtering material, and then in the other shell, and screw up tight with a screw-driver; then take shears and cut off what projects of the filtering material on the outside of the filter or filter-case.

What I claim as my invention, and desire to secure by Letters Patent, is—

In a filter or filter-case, the combination, with two shells, A A, having collars penetrating to the center of said filter-case, and provided with water-ways E E, of filtering material C and screw D, whereby the filtering material is securely held in place between the two shells, substantially as described.

In testimony that I claim the foregoing as my invention I have signed my name, in presence of two witnesses, this 23d day of October, 1883.

EDWIN S. RICH.

Witnesses:
HOMER WORDEN,
SAMUEL SAVALL.